(12) United States Patent
Heinzel et al.

(10) Patent No.: US 12,358,789 B2
(45) Date of Patent: Jul. 15, 2025

(54) METHOD AND DEVICE FOR PRODUCING SYNTHESIS GAS WITH CARBON DIOXIDE RETURN

(71) Applicant: Linde GmbH, Pullach (DE)

(72) Inventors: Albrecht Heinzel, Munich (DE); Thomas Haselsteiner, Dietramszell (DE); Stefan Pleintinger, Munich (DE)

(73) Assignee: Linde GmbH, Pullach (DE)

( * ) Notice: Subject to any disclaimer, the term of this patent is extended or adjusted under 35 U.S.C. 154(b) by 947 days.

(21) Appl. No.: 17/310,928

(22) PCT Filed: Feb. 20, 2020

(86) PCT No.: PCT/EP2020/025079
§ 371 (c)(1),
(2) Date: Aug. 31, 2021

(87) PCT Pub. No.: WO2020/177922
PCT Pub. Date: Sep. 10, 2020

(65) Prior Publication Data
US 2022/0135402 A1    May 5, 2022

(30) Foreign Application Priority Data
Mar. 6, 2019  (DE) .......................... 102019001557.6

(51) Int. Cl.
*C01B 3/34* (2006.01)
*C01B 3/50* (2006.01)

(52) U.S. Cl.
CPC ............... *C01B 3/34* (2013.01); *C01B 3/501* (2013.01); *C01B 2203/0216* (2013.01);
(Continued)

(58) Field of Classification Search
None
See application file for complete search history.

(56) References Cited

U.S. PATENT DOCUMENTS 4,181,675 A * 1/1980 Makin ................ C07C 29/1512
                                                      95/55
2014/0005285 A1   1/2014 Wynn et al.
(Continued)

FOREIGN PATENT DOCUMENTS

FR    2823192 A1   10/2002
GB    2494751 A    3/2013

*Primary Examiner* — Joseph D Anthony
(74) *Attorney, Agent, or Firm* — Millen, White, Zelano & Branigan, P.C.; Brion P. Heaney

(57) ABSTRACT

A method and to a device for producing a synthesis gas, which contains carbon monoxide and hydrogen, wherein natural gas having a first carbon dioxide partial pressure ($CO_2$ pressure) is provided and is processed inter alia by means of a pressure increase to form a natural gas input for a thermochemical conversion, in which a synthesis raw gas having a second $CO_2$ pressure greater than the first CO2 pressure is produced, from which synthesis raw gas at least carbon dioxide is subsequently separated in order to obtain the synthesis gas and carbon dioxide, at least some of which is returned and is used in the thermochemical conversion of the natural gas input. To separate carbon dioxide, the synthesis raw gas is conducted across the one membrane on the retentate side, which membrane is permeable to carbon dioxide and is flushed on the permeate side by the provided natural gas.

15 Claims, 1 Drawing Sheet

(52) U.S. Cl.
 CPC ............... *C01B 2203/0255* (2013.01); *C01B 2203/0475* (2013.01); *C01B 2203/1241* (2013.01); *C01B 2203/148* (2013.01)

(56) References Cited

U.S. PATENT DOCUMENTS

2014/0264176 A1   9/2014  Wynn et al.
2022/0041442 A1*  2/2022  Coleman ................ C01B 3/501

* cited by examiner

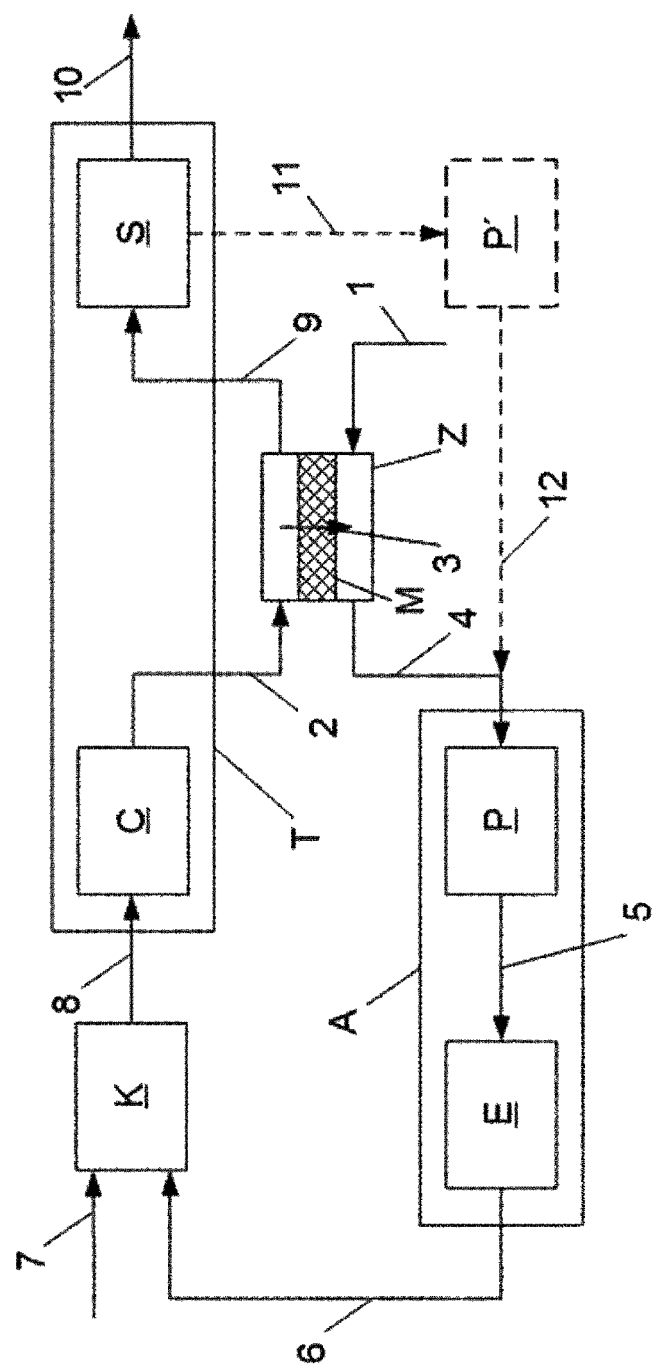

METHOD AND DEVICE FOR PRODUCING SYNTHESIS GAS WITH CARBON DIOXIDE RETURN

The invention relates to a method for producing a synthesis gas, which contains carbon monoxide and hydrogen, wherein natural gas having a first carbon dioxide partial pressure ($CO_2$ pressure) is provided and is processed inter alia by means of a pressure increase to form a natural gas input for a thermochemical conversion, in which a synthesis raw gas having a second $CO_2$ pressure greater than the first $CO_2$ pressure is produced, from which synthesis raw gas at least carbon dioxide is subsequently separated in order to obtain the synthesis gas and carbon dioxide, at least some of which is returned and is used in the thermochemical conversion of the natural gas input.

The invention also relates to a device for carrying out the method according to the invention.

Synthesis gases containing carbon monoxide and hydrogen are produced from natural gas predominantly by autothermal reforming (ATR), partial oxidation (PDX), steam reforming (SMR) or combinations of said methods, which have been known from the prior art for many years. In this case, the natural gas is processed, for example, by desulfurization, heating and compression to form a natural gas input, which is subsequently converted thermochemically to form a synthesis raw gas which, in addition to carbon monoxide and hydrogen, also contains a larger amount of carbon dioxide and water and other undesirable substance in the synthesis gas. The synthesis raw gas, the pressure of which substantially corresponds to the pressure of the natural gas input, is, therefore, subjected to a plurality of separating steps in order to obtain the synthesis gas in a required composition.

It is known from the prior art to separate carbon dioxide from the synthesis raw gas, to return it, and to use it in the conversion of the natural gas input. The returned carbon dioxide is converted with hydrogen to form carbon monoxide and water or with elemental carbon to form carbon monoxide, whereby the carbon monoxide content in the synthesis raw gas is increased.

To separate the carbon dioxide, the synthesis raw gas is subjected to gas scrubbing in which carbon dioxide is absorbed by a detergent which thereby accumulates loaded with carbon dioxide. The pressure of the loaded detergent is then decreased in order to desorb carbon dioxide so that, in addition to regenerated detergent for reuse in the gas scrubbing, carbon dioxide is obtained with a pressure that is significantly below the pressure of the synthesis raw gas and of the natural gas input.

Gas scrubbing, such as methanol scrubbing or amine scrubbing, which is suitable for separating carbon dioxide from synthesis raw gases, results in high investment and operating costs and for that reason alone has a negative impact on the economic efficiency of the synthesis gas production. If the carbon dioxide obtained in the gas scrubbing is returned and used in the conversion of the natural gas input, the cost of the equipment and energy required for the carbon dioxide compression needed has an additional impact on economic efficiency.

The object of the present invention is, therefore, to provide a method of the generic type and a device for carrying out the said method, which are suitable for overcoming the described disadvantages of the prior art and increasing the economic efficiency of the production of synthesis gas.

In terms of the method, the object is accomplished according to the invention in that, in order to separate carbon dioxide, the synthesis raw gas is conducted across a membrane on the retentate side, which membrane is permeable to carbon dioxide and is flushed on the permeate side by the provided natural gas.

The separation of carbon dioxide from a gas mixture containing carbon dioxide with the aid of a membrane has long been prior art. A membrane suitable for this purpose has a high permeability to and selectivity for carbon dioxide, while it is either impermeable or is significantly less permeable to all or at least most of the remaining components. On the permeate side of the membrane, therefore, the separated carbon dioxide can be obtained in a permeate stream, while the remaining components of the gas mixture are withdrawn as a retentate stream from the other side, the retentate side of the membrane.

In addition to the material properties, the thickness and the cross-sectional area of the membrane, the difference between the $CO_2$ pressures on the retentate and permeate sides is particularly decisive for the level of permeability. The greater this difference, the greater the permeability and the more effective the separation of carbon dioxide from the carbon dioxide-containing gas mixture. In order to prevent a reduction in this pressure difference due to the accumulation of carbon dioxide on the permeate side, the permeate side is swept with a purge gas that has a low $CO_2$ pressure.

Due to the different $CO_2$ pressures in the provided natural gas and the synthesis raw gas, therefore, at least some of the carbon dioxide present in the synthesis raw gas is separated and passes via the membrane directly into the provided natural gas, together with which it is carried forward and processed to form the natural gas input. In particular, the carbon dioxide separated via the membrane is compressed together with the natural gas so that, for its return, the use of a separate carbon dioxide compressor may be dispensed with.

The method according to the invention is more effective the greater the difference in the $CO_2$ pressures of the two gas streams. Expediently, the $CO_2$ pressure in the synthesis raw gas is greater by at least a factor of 10 than the $CO_2$ pressure in the natural gas.

Expediently, to separate the carbon dioxide from the synthesis raw gas, a membrane is used which has a high permeability to carbon dioxide but does not allow the other components present in the synthesis raw gas to pass through or only allows them to pass through more poorly so that the carbon dioxide is largely selectively separated from the synthesis raw gas.

Depending on the sulfur content of the provided natural gas and on the method used for converting the natural gas input, a desulfurization step may be necessary during the processing of the natural gas provided. The sulfur is hereby hydrogenated to give hydrogen sulfide, which is subsequently removed by adsorption. According to the prior art, the hydrogen required for the hydrogenation is separated from the synthesis raw gas in a complex manner, for example by pressure swing adsorption, and mixed with the natural gas to be processed. If the natural gas is present at a higher pressure than the returned hydrogen, the hydrogen must be compressed.

By contrast, one embodiment of the method according to the invention provides for the synthesis raw gas to be conducted across a membrane which is permeable not only to carbon dioxide but also to hydrogen, so that carbon dioxide and hydrogen are largely selectively separated from the synthesis raw gas. Expediently, the membrane allows hydrogen to pass through in a quantity that at least allows the hydrogenation of some of the sulfur components present in the provided natural gas, which is used as purge gas on the permeate side of the membrane. The membrane is expediently selected such that no more than the quantity of hydrogen required for the hydrogenation of the sulfur components enters the provided natural gas via the membrane.

The synthesis raw gas which is depleted in its carbon dioxide content via the membrane and withdrawn as a retentate stream does not usually meet the purity requirements imposed on the synthesis gas. In particular, its carbon dioxide content will be too high, so the synthesis raw gas must be subjected to a further separation step to remove the carbon dioxide. If the production of carbon monoxide during synthesis gas production is paramount, an expedient embodiment of the method according to the invention provides for carbon dioxide obtained in the further separating step to be returned to the thermochemical conversion of the natural gas input. The synthesis raw gas depleted in its carbon dioxide content is preferably supplied here to acid gas scrubbing in order to separate off carbon dioxide as completely as possible and to obtain it in a largely selective manner.

However, the total amount of carbon dioxide to be returned for the production of the synthesis raw gas is preferably separated from the synthesis raw gas via the membrane, so that no carbon dioxide that is potentially still to be separated from the synthesis raw gas downstream of the membrane needs to be returned in a complex manner and can be used otherwise.

The method according to the invention is used with particular preference when the natural gas input is converted by steam reforming. However, the use of the method is also advantageous when the synthesis raw gas is obtained by partial oxidation, autothermal reforming or another thermochemical conversion method.

The invention further relates to a device for producing a synthesis gas containing carbon monoxide and hydrogen, with a processing apparatus comprising a compressor for processing a natural gas provided with a first carbon dioxide partial pressure ($CO_2$ pressure) to form a natural gas input; a converter, in which the natural gas input may be thermochemically converted to a synthesis raw gas having a second $CO_2$ pressure greater than the first $CO_2$ pressure; and a separating apparatus, in which the synthesis gas may be obtained from the synthesis raw gas at least by the separation of carbon dioxide, wherein the separating apparatus is connected to the converter in such a way that carbon dioxide separated from the synthesis raw gas can be returned and used in the thermochemical conversion of the natural gas input.

In terms of the device, the object is accomplished according to the invention in that the processing apparatus is connected to the separating apparatus via a membrane module having a membrane permeable to carbon dioxide, to which the synthesis raw gas can be fed on the retentate side, while the natural gas provided can be used as purge gas on the permeate side.

The membrane is preferably permeable to carbon dioxide, while it is practically impermeable to the remaining substances present in the synthesis raw gas. In one embodiment of the invention, however, the membrane is permeable not only to carbon dioxide but also to hydrogen, while it is practically impermeable to the remaining substances present in the synthesis raw gas.

The membrane permeable to carbon dioxide preferably consists of a rubber- or glass-like polymer material, as is known from the prior art. It may also be constructed as a composite membrane in which active components, such as amine groups, ensure an improvement in selectivity.

In addition to the membrane module, the separating apparatus may have a further apparatus, which is arranged downstream of the membrane module and fluidically connected to the converter, for separating carbon dioxide from the synthesis raw gas so that further carbon dioxide can be separated from the synthesis raw gas and returned to the converter. This apparatus is preferably an acid gas scrubber with which carbon dioxide may be substantially completely removed from the synthesis raw gas, which is depleted in its carbon dioxide content, and recovered largely selectively.

The thermochemical converter may be any type of reactor known from the prior art for use in the production of synthesis gas from natural gas. However, the thermochemical converter is preferably a steam reformer, an autothermal reformer, or a PDX reactor.

The invention is explained in more detail below using an exemplary embodiment schematically illustrated in FIG. 1.

FIG. 1 shows the invention in a first and a second preferred variant.

In both preferred variants, natural gas is provided via line 1 in order to convert it to a synthesis raw gas 2 containing hydrogen and carbon monoxide, in which synthesis raw gas carbon dioxide is present at a higher partial pressure than in the provided natural gas 1. Both the provided natural gas 1 and the synthesis raw gas 2 are introduced into the membrane module Z, in which a membrane M that is selectively permeable to carbon dioxide is arranged, the retentate side of which is swept by the synthesis raw gas 2 and the permeate side of which is swept by the provided natural gas 1. Due to its greater partial pressure on the permeate side, carbon dioxide 3 is separated from the synthesis raw gas 2 via the membrane M and transferred into the natural gas 1 acting as a purge gas, which, enriched with carbon dioxide, leaves the membrane module Z via line 4. In the processing apparatus A, the natural gas 4 enriched with carbon dioxide is first compressed via the compressor P and then supplied via line 5 to the desulfurization apparatus E in order to obtain a largely sulfur-free natural gas input 6. Together with steam 7, the natural gas input 6 is fed to the converter K, which is, for example, an SMR reactor or an ATR reactor, and thermally converted to a synthesis raw gas 8 rich in carbon monoxide and containing hydrogen, water and carbon dioxide, which, after cooling and the removal of water, is conducted from the cooling apparatus C arranged in the separating apparatus T, via line 2 into the membrane module Z for the separation of carbon dioxide. In the acid gas scrubbing S, the synthesis gas 10 consisting largely of hydrogen and carbon monoxide is finally obtained from the carbon-dioxide-depleted synthesis raw gas 9, in particular by the removal of remaining carbon dioxide.

In order to increase the carbon monoxide content in the synthesis gas 10, in the second preferred variant of the invention, the carbon dioxide 11 separated in the acid gas scrubbing S from the carbon-dioxide-depleted synthesis raw gas 8 is compressed via the compressor P' and subsequently admixed via line 12 to the natural gas 4 already enriched with carbon dioxide.

The invention claimed is:

1. A method for producing a synthesis gas, which contains carbon monoxide and hydrogen, comprising:
providing a natural gas having a first carbon dioxide partial pressure ($CO_2$ pressure) and increasing the pressure of the natural gas to form a natural gas input for a thermochemical conversion, producing a synthesis raw gas having a second $CO_2$ pressure greater than the first $CO_2$ pressure by the thermal conversion, separating carbon dioxide from the synthesis raw gas to obtain a synthesis gas and carbon dioxide, and returning at least some of the carbon dioxide to the thermochemical conversion, wherein, in separating the carbon dioxide from the synthesis raw gas, the synthesis raw gas is conducted across a membrane on a retentate side, which membrane is permeable to carbon dioxide, and carbon dioxide is flushed on a permeate side of the membrane by the natural gas to form a carbon dioxide enriched natural gas for use as the natural gas input for the thermochemical conversion.

2. The method according to claim 1, wherein carbon dioxide is selectively separated from the synthesis raw gas via the membrane.

3. The method according to claim 1, wherein carbon dioxide and hydrogen are selectively separated from the synthesis raw gas via the membrane.

4. The method according to claim 1, wherein the thermal conversion of the natural gas input takes place by steam reforming or autothermal reforming or partial oxidation.

5. A device for producing a synthesis gas, which contains carbon monoxide and hydrogen, comprising:

a processing apparatus comprising a compressor for increasing the pressure a natural gas provided with a first carbon dioxide partial pressure ($CO_2$ pressure) to form a natural gas input;

a converter for thermochemically converting the natural gas input to obtain a synthesis raw gas having a second $CO_2$ pressure greater than the first $CO_2$ pressure; and a separating apparatus for separating carbon dioxide from the synthesis raw gas to obtain a synthesis gas, wherein the separating apparatus is connected to the converter whereby carbon dioxide separated from the synthesis raw gas is returned and used in the thermochemical conversion of the natural gas input, wherein the processing apparatus is connected to the separating apparatus via a membrane module having a membrane which is permeable to carbon dioxide and to which the synthesis raw gas is fed on a retentate side of the membrane, and the natural gas is used as purge gas on a permeate side of the membrane to form a carbon dioxide enriched natural gas for use as the natural gas input for the thermochemical conversion.

6. The device according to claim 5, wherein the membrane is selectively permeable to carbon dioxide.

7. The device according to claim 5, wherein the membrane is selectively permeable to carbon dioxide and hydrogen.

8. The device according to claim 5, wherein the membrane consists of a rubber-like or glass-like polymer material or is constructed as a composite membrane with active components.

9. The device according to claim 5, wherein the thermal converter is a steam reformer or an autothermal reformer or a POX reactor.

10. The method according to claim 1, wherein the thermal conversion is performed in a steam reformer, an autothermal reformer, or a POX reactor.

11. The method according to claim 1, wherein the synthesis raw gas depleted in carbon dioxide is removed from the retentate side of the membrane sent to acid gas scrubbing to remove additional carbon dioxide.

12. The method according to claim 1, wherein the $CO_2$ pressure in the synthesis raw gas is greater by at least a factor of 10 than the $CO_2$ pressure in the natural gas.

13. The method according to claim 1, wherein the membrane consists of a rubber-like or glass-like polymer material or is constructed as a composite membrane.

14. The method according to claim 1, wherein carbon dioxide enriched natural gas removed from the permeate side of the membrane is compressed and desulfurized before being used as the natural gas input for the thermochemical conversion.

15. The method according to claim 14, wherein the synthesis raw gas depleted in carbon dioxide is removed from the retentate side of the membrane sent to acid gas scrubbing to remove additional carbon dioxide, and carbon dioxide removed by the acid gas scrubbing is combined with the carbon dioxide enriched natural gas removed from the permeate side of the membrane and compressed therewith.

* * * * *